United States Patent [19]

Fujiki et al.

US005767193A

[11] Patent Number: 5,767,193
[45] Date of Patent: Jun. 16, 1998

[54] CURABLE SILICONE ELASTOMER COMPOSITION AND METHOD OF PREPARING THE SAME

[75] Inventors: Hironao Fujiki; Kouichi Tanaka, both of Gunma-ken, Japan

[73] Assignee: Shin-Etsu Chemical Co., Ltd., Tokyo, Japan

[21] Appl. No.: 712,388

[22] Filed: Sep. 11, 1996

[30] Foreign Application Priority Data

Sep. 12, 1995 [JP] Japan ................... 7-260760

[51] Int. Cl.$^6$ ........................................... C08K 3/00
[52] U.S. Cl. ..................... 524/847; 524/493; 524/588; 524/862; 524/863
[58] Field of Search ..................... 524/862, 863, 524/847, 588, 493

[56] References Cited

U.S. PATENT DOCUMENTS

| | | | |
|---|---|---|---|
| 4,022,747 | 5/1977 | Itoh et al. | 524/863 |
| 4,558,109 | 12/1985 | McAfee | 528/15 |
| 4,946,878 | 8/1990 | Jensen et al. | 523/213 |
| 5,216,104 | 6/1993 | Okami et al. | 528/15 |
| 5,378,742 | 1/1995 | Matsushita et al. | 523/213 |
| 5,435,839 | 7/1995 | Ogawa | 106/10 |
| 5,504,147 | 4/1996 | Fujiki et al. | 524/730 |
| 5,550,185 | 8/1996 | Inoue et al. | 524/847 |
| 5,561,184 | 10/1996 | Miyoshi et al. | 524/425 |
| 5,563,211 | 10/1996 | Kosal et al. | 524/862 |

*Primary Examiner*—Karen A. Dean
*Attorney, Agent, or Firm*—Millen, White, Zelano & Branigan, P.C.

[57] ABSTRACT

Provided are a non-foaming curable silicone elastomer composition and a method of preparing such a composition: with the composition comprising (A) 100 parts by weight of an organopolysiloxane mixture constituted at least of 90–10 parts by weight of organopolysiloxanes (i) containing, in a molecule, at least two alkenyl groups and substantially no silicon-attached hydroxyl group and having their kinematic viscosity in the range of 100 to 100,000 centistokes (cSt) at 25° C. and 10–90 parts by weight of organopolysiloxanes (ii) containing, in a molecule, at least one hydroxyl group attached directly to a silicon atom and at least one alkenyl group attached directly to a silicon atom and having their kinematic viscosity in the range of 100 to 100,000 cSt at 25° C.; (B) organohydrogenpolysiloxanes having in each molecule at least 3 hydrogen atoms attached directly to silicon atoms in an amount that the organohydrogenpolysiloxanes afford 0.4–10.0 moles of silicon-attached hydrogen atoms to 1 mole of alkenyl groups supplied from the organopolysiloxane mixture (A); (C) a platinum group metal catalyst; and (D) 10–60 parts by weight of finely powdered silica having a specific surface area of at least 50 m$^2$/g, measured by BET method.

11 Claims, No Drawings

CURABLE SILICONE ELASTOMER COMPOSITION AND METHOD OF PREPARING THE SAME

FIELD OF THE INVENTION

The present invention relates to a liquid silicone rubber composition and, more particularly, to a non-foaming curable silicone elastomer composition which has low viscosity and can provide a cured matter having high strength.

BACKGROUND OF THE INVENTION

Hitherto, liquid silicone compositions have been used as a potting material for component parts of electric and electronic devices, a coating agent for cloth, leather, resin films and so on, and a raw material for silicone rubber parts such as a silicone rubber mother mold for production of resin-or metal-made duplicate, a pad for pad printing and so on.

The silicone rubber used for such purposes is required to have high strength. In order to obtain silicone rubber of high strength, a liquid silicone rubber composition having high viscosity is generally used. In molding such a composition, however, limited methods alone can be adopted; as a result, the silicone rubber obtained has restrictions on its use.

The drawback of having restrictions can be removed for the most part by the compositions having low viscosity before curing but being converted into cured matters having high physical strength by undergoing a curing treatment (as disclosed, e.g., in Japanese Patent Publication (JP-B) Nos. 40447/1972 and 24625/1988).

Even when the compositions as mentioned above are used, however, problems still remain to be solved. More specifically, those compositions cannot provide cured matters having sufficient strength if an adhesive agent and an active filler are incorporated therein as additional components, because the chain of the alkenyl group-containing organopolysiloxane present therein is lengthened by the bifunctional hydrogenpolysiloxane upon curing, and a polyfunctional hydrosilyl group-containing compound used for heightening the strength of the cured matters has limitations on its content in the compositions.

As for the art of lowering the viscosity of a liquid silicone rubber composition, on the other hand, there is known the method of dispersing a silica filler in a high proportion by a high shearing force into some portion of an organopolysiloxane to be used and then diluting the resultant dispersion with the remaining portion of the organopolysiloxane.

However, such a method suffers from disadvantages of having limits on the viscosity lowered thereby, and generating undispersed lumps of a filler because the dispersion is carried out under high shear stress.

As a result of our intensive studies of the aforementioned problems, it has been found that a non-foaming curable silicone elastomer composition which, although it has low viscosity in an uncured condition, can be converted into a cured matter having high strength when undergoes a curing treatment can be obtained by the use of special organopolysiloxanes having, in each molecule, at least one hydroxyl group and at least one alkenyl group attached directly to silicon atoms, thereby achieving the present invention.

SUMMARY OF THE INVENTION

Therefore, a first object of the present invention is to provide a non-foaming curable silicone elastomer composition which has low viscosity before it undergoes a curing treatment, and is converted into a cured matter having high strength upon curing.

A second object of the present invention is to provide a method of preparing a non-foaming curable silicone elastomer composition which has low viscosity before it undergoes a curing treatment, and is converted into a cured matter having high strength upon curing.

The aforesaid objects of the present invention are attained by a non-foaming curable silicone elastomer composition, and a preparation method thereof; with the composition containing as essential components:

(A) 100 parts by weight of organopolysiloxanes having an average compositional formula, $R_aSiO_{(4-a)/2}$, wherein R represents a hydroxyl group or a substituted or unsubstituted monovalent hydrocarbon group and a is a figure of from 1.85 to 2.4, the organopolysiloxanes being constituted at least of 90–10 parts by weight of the organopolysiloxanes (i) defined hereinafter and 10–90 parts by weight of the organopolysiloxanes (ii) defined hereinafter;

(B) organohydrogenpolysiloxanes which are represented by an average compositional formula, $R^1_bH_cSiO_{(4-b-c)/2}$, wherein $R^1$ is a substituted or unsubstituted monovalent hydrocarbon group which contains no aliphatic unsaturated bond, b is a figure of from 0.7 to 2.2 and c is a figure of from 0.01 to 1.2, provided that the sum b+c is from 1 to 2.5, and have in each molecule at least 3 hydrogen atoms attached directly to silicon atoms, in an amount that the organohydrogenpolysiloxanes afford 0.4–10.0 moles of silicon-attached hydrogen atoms (i.e., SiH groups) to 1 mole of alkenyl groups supplied from Component (A);

(C) a platinum group metal catalyst; and (D) 10–60 parts by weight of finely powdered silica having a specific surface area of at least 50 $m^2/g$.

The non-foaming curable silicone elastomer composition obtained in accordance with the present invention can be molded with ease because of its low viscosity and, when it is cured, the strength of the resultant cured matter is very high. Therefore, the present composition can be used for much more purposes than conventional ones.

Further, the method of the present invention enables simple preparation of a non-foaming curable silicone elastomer composition which not only has low viscosity but also provide a cured matter of high strength.

DETAILED DESCRIPTION OF THE INVENTION

The Component (A) used in the present invention is organopolysiloxanes represented by an average compositional formula, $R_aSiO_{(4-a)/2}$. R in the formula is a hydroxyl group, or a substituted or unsubstituted monovalent hydrocarbon group.

As examples of such a substituted or unsubstituted monovalent hydrocarbon group, mention may be made of hydrocarbon groups containing 1 to 10 carbon atoms, especially those containing 1 to 8 carbon atoms, including alkyl groups such as methyl, ethyl, propyl, isopropyl, butyl, isobutyl, t-butyl, hexyl, cyclohexyl and octyl groups, alkenyl groups such as vinyl, allyl, propenyl, isopropenyl and butenyl groups, aryl groups such as phenyl, tolyl and xylyl groups, aralkyl groups such as benzyl and phenylethyl groups, and halogenated hydrocarbon groups such as 3,3,3-trifluoropropyl, chloromethyl and bromoethyl groups. R groups present in the organopolysiloxanes may be the same or different. a in the foregoing average compositional formula is a figure of from 1.85 to 2.4, preferably from 1.9 to 2.1.

These organopolysiloxanes may take a straight-chain form, or a cyclic or branched-chain form by containing $RSiO_{3/2}$ or $SiO_{4/2}$ units (wherein R has the same meaning as described above). In general, however, the main chain part thereof is constituted of diorganosiloxane units ($R_2SiO_{2/2}$) alone and each terminal part thereof is blocked by a triorganosiloxy ($R_3SiO_{1/2}$) or hydroxydiorganosiloxy ($R_2(OH)SiO_{1/2}$) group.

The constituent (i) of Component (A) is organopolysiloxanes containing, in a molecule, at least two alkenyl groups and substantially no silicon-attached hydroxyl group and having their kinematic viscosity in the range between 100 and 100,000 centistokes (cSt) at 25° C., preferably straight-chain diorganopolysiloxanes having from about 50 to about 1,500 silicon atoms in a molecule (or a polymerization degree of about 50–1,500), which are usually applied to addition curable silicone compositions.

As for the alkenyl groups present in the constituent (i), those containing 2 to 6 carbon atoms, such as a vinyl group, an allyl group, a propenyl group, an isopropenyl group, a butenyl group, etc., are examples thereof. Of these alkenyl groups, a vinyl group is preferred over the others. The silicon atoms to which such alkenyl groups are attached may be located either at the ends or in the middle of a molecular chain, or at the both positions. From the viewpoints of a curing speed of the resultant composition and physical strength of the cured matter formed therefrom, however, it is preferable that at least two of the alkenyl group-attached silicon atoms be located at both molecular-chain ends, respectively.

Of the substituent groups other than the foregoing alkenyl group, alkyl groups, such as a methyl group, are advantageous. In cases where the cured matter is required to have high solvent resistance, a trifluoropropyl group is preferred in combination with methyl groups. When the number of alkenyl groups present in the organopolysiloxanes used as constituent (i) is less than 2 per molecule, the resultant composition cannot have sufficient curability.

The expression "containing, in a molecule, substantially no silicon-attached hydroxyl group" means that any of R groups in the foregoing average compositional formula does not represent a hydroxyl group.

When the kinematic viscosity of the constituent (i) at 25° C. is less than 100 cSt, the strength of a cured matter obtained is lowered; while, when the kinematic viscosity thereof is increased beyond 100,000 cSt, it becomes difficult to lower the viscosity of the intended composition.

Specific examples of the constituent (i) include the organopolysiloxanes represented by the following formulae (1), (2), (3) and (4):

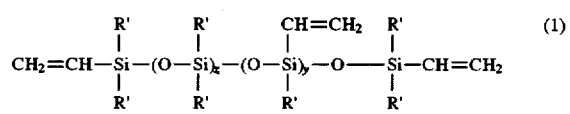

(1)

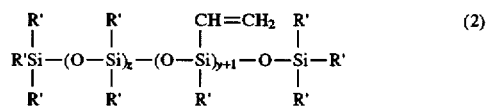

(2)

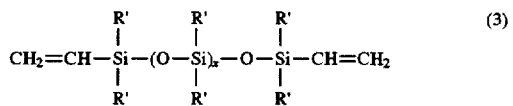

(3)

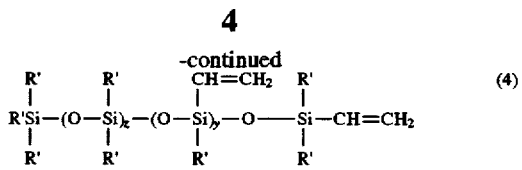

(4)

In the above formulae, R' has the same meaning as R in the foregoing average compositional formula, except that R' represents neither an alkenyl group nor a hydroxy group.

x, y and z are each a positive integer satisfying the following relations: $50 \leq x \leq 1500$, $1 \leq y \leq 50$ and $50 \leq z+y \leq 1500$, preferably $100 \leq x \leq 1000$, $1 \leq y \leq 2$ and $100 \leq y+z \leq 1000$. When the value of x or y+z is too small, the cured matter obtained by curing the resultant composition becomes fragile; while, when such a value is too large, the viscosity of the resultant composition becomes high to deteriorate the fluidity thereof.

The constituent (ii) of Component (A) is organopolysiloxanes containing, in a molecule, at least one hydroxyl group attached directly to a silicon atom (i.e., at least one silanol group) and at least one alkenyl group attached directly to a silicon atom, and having their kinematic viscosity in the range of 100 to 100,000 cSt at 25° C. Organopolysiloxanes having their kinematic viscosity in such a range are equivalent to those containing about 50 to about 1,500 silicon atoms in a molecule (in other words, having a polymerization degree of about 50 to about 1500).

Similarly to the aforementioned constituent (i), it is generally desirable that the constituent (ii) be straight-chain diorganopolysiloxanes. As for the hydroxyl group and the alkenyl group contained in such a diorganopolysiloxane molecule, each of them is required to be at least one, preferably one or two, in number. While the silicon atoms to which alkenyl groups are attached may be located either at the ends or in the middle of a molecular chain, or at the both positions, the location of the hydroxyl groups are preferably on the silicon atoms of the molecular-chain ends from the standpoints of synthesis and decrease in viscosity of the intended composition.

Mixing with the constituent (ii) makes it possible to considerably lower the viscosity which the intended composition has before undergoing a curing treatment and, at the same time, ensures sufficient strength in the resultant cured matter. Although the viscosity of a silicone elastomer composition before curing can also be lowered by using an alkenyl group-free organopolysiloxane having a polymerization degree of at least 50 and containing hydroxysilyl groups in place of the constituent (ii), physical properties of the cured matter obtained by curing such a composition are too bad to stand use for the intended purposes.

Specific examples of an organopolysiloxane as constituent (ii) include those represented by the following formulae (5), (6) and (7):

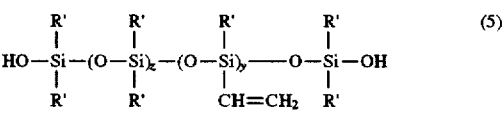

(5)

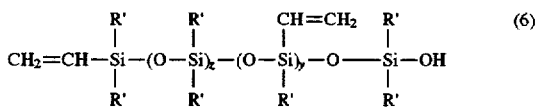

(6)

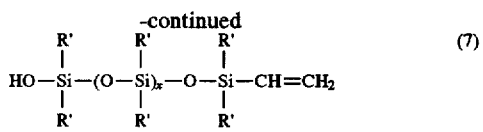

(7)

In the above formulae, R', x, y and z have the same meanings as those described hereinbefore with respect to organopolysiloxanes as constituent (i), respectively. In cases where z+y is less than 50 in the organopolysiloxanes exemplified above, the fluidity of the resultant composition is decreased, though an increase thereof may have been expected. This is because the resultant composition shows a marked tendency to thixotropy.

Component (B) used in the present invention is organohydrogenpolysiloxanes which are represented by an average compositional formula $R^1{}_b H_c SiO_{(4-b-c)/2}$ and have in each molecule at least 3 hydrogen atoms attached directly to silicon atoms (i.e., SiH groups).

In the foregoing average compositional formula, $R^1$ is a substituted or unsubstituted monovalent hydrocarbon group which contains no aliphatic unsaturated bond, b is a number of from 0.7 to 2.2 and c is a number of from 0.01 to 1.2, provided that the sum b+c is from 1 to 2.5. In particular, it is preferable for b to be from 1 to 2, and for c to be from 0.05 to 0.6 so far as the sum b+c is from 1.8 to 2.2.

As for the aliphatic unsaturated bond-free substituted or unsubstituted monovalent hydrocarbon group represented by $R^1$, the same substituent groups as recited in the case of Component (A), excluding alkenyl groups, are examples thereof.

The organohydrogenpolysiloxanes as Component (B) are not particularly restricted as to their molecular structures. In other words, they may form a straight-chain structure, a cyclic structure or a branched chain structure, or they may be resinous matters forming a three-dimensional reticulated structure. Further, an appropriate number of silicon atoms contained in such an organohydrogenpolysiloxane molecule is generally from 3 to 200, particularly of the order of 4-120.

The platinum group metal catalyst used as Component (C) is a catalyst containing a platinum group metal, such as platinum, palladium or rhodium, suitable for an addition reaction system, and incorporated in the present composition for the purpose of promoting the addition reaction between Component (A) and Component (B).

Specific examples of a platinum group catalyst used for the addition reaction include platinum black, chloroplatinic acid, alcohol-modified chloroplatinic acids and the complex salts provided by chloroplatinic acid and olefines, aldehydes, vinylsiloxanes or acetylene alcohols.

Finely powdered silica used as Component (D) serves to heighten the physical strength of the elastomer (cured matter) obtained by curing a silicone composition. From the standpoint of using the present composition as a mother mold material for which high strength is required upon blocking, particularly as a material capable of reproducing a mother mold having an inverted taper shape, it is desirable to use a finely powdered silica having a specific surface area of at least 50 m²/g, generally from 50 to 1,000 m²/g, particularly of the order of 100-500 m²/g, determined by the BET method.

Specific examples of such a finely powdered silica include fumed silica and precipitated silica, that is, hydrophilic silica fine powders which have substantial amount of silanol groups on their surfaces, such as Aerosil 130, Aerosil 200 and Aerosil 300 (which are the trade names of products of Nippon Aerosil Co., Ltd. or Degussa Co.), Cabosil MS-5 and Cabosil MS-7 (which are the trade names of products of Cabot Co.), Rheorosil QS-102 and Rheorosil QS-103 (which are the trade names of products of Tokuyama Soda Co., Ltd.) and Nipsil P (which is the trade name of a product of Nippon Silica Co., Ltd.); and hydrophobic silica fine powders wherein silanol groups are blocked with organosiloxy groups, such as a trimethylsiloxy group (($CH_3)_3SiO_{1/2}$ unit), a dimethylsiloxy group (($CH_3)_2SiO_{1/2}$ unit) and a methylsiloxy group (($CH_3)SiO_{3/2}$ unit), with exampales including Aerosil R-812, Aerosil R-812S, Aerosil R-972 and Aerosil R-974 (which are the trade names of products of Degussa Co.), Rheorosil MT-10 and Rheorosil MT-30 (which are the trade names of products of Tokuyama Soda Co., Ltd.) and Nipsil SS series (which are trade names of products of Nippon Silica Co., Ltd.).

Of these silica fine powders, the present invention prefers hydrophobic ones from the standpoint of preventing the composition's viscosity from increasing upon long-range storage. This is because, in case of using a hydrophilic silica powder, not only the aforementioned constituent (ii) having reactive hydroxysilyl groups (silanol groups) undergoes reaction or pseudo cross-linking with ammonia which remains on the silica powder surface, as described hereinafter, when the silica powder is treated with an organosilazane compound, but also hydroxysilyl groups in the constituent (ii) react with those on the hydrophilic silica surface; as a result, the viscosity of the composition is increased.

The present non-foaming curable silicone elastomer composition can be prepared by mixing and stirring homogeneously at least 100 parts by weight of Component (A) constituted of 90 to 10 parts by weight, preferably 70 to 30 parts by weight, of constituent (i) and 10 to 90 parts by weight, preferably 30 to 70 parts by weight, of constituent (ii), Component (B) in a proportion described hereinafter, Component (C) and 10 to 60 parts by weight of Component (D).

When the content of constituent (ii) in Component (A) is less than 10 parts by weight, the composition obtained increases in viscosity; while, when it is more than 90 parts by weight, the cured matter obtained by curing the resultant composition suffers deterioration in physical properties.

It is required for the aforementioned Component (B) to be contained in the present composition in such an amount that silicon-attached hydrogen atoms (i.e., SiH groups) are present in a proportion of 0.4–10.0 moles, particularly preferably 0.8–2 moles, to 1 mole of alkenyl groups supplied from Component (A). When the proportion of silicon-attached hydrogen atoms is less than 0.4 mole to 1 mole of alkenyl groups, the cured matter obtained cannot have satisfactory heat resistance because of too low cross-linking density; while, when it is increased beyond 10 moles to 1 mole of alkenyl groups, the resultant composition foams due to dehydrogenation reaction upon curing and deteriorates in heat resistance.

The amount of Component (C) is chosen properly depending upon the curing speed of an intended composition. Specifically, the proportion of Component (C) to Component (A) is generally from 0.1 to 1,000 ppm, preferably from 1 to 200 ppm, based on platinum.

The aforementioned Component (D) is incorporated in the present composition in a proportion of 10–60 parts by weight to 100 parts by weight of Component (A). When the proportion of Component (D) is less than 10 parts by weight, the strength-increasing effect of Component (D) upon the cured matter is insufficient; while, when it is increased beyond 60 parts by weight, the resultant composition deteriorates in molding properties because the viscosity thereof becomes high.

Additionally, the mixing and stirring operation can be performed using a known means.

It is desirable for the present composition to be prepared in the following manner: After adding Component (D) to all or a part (for example, at least 50 weight %, preferably 60–100 weight %) of Component (A), an organosilazane compound and optionally water are admixed therewith in prescribed proportions to Component (D), and then the resultant mixture is subjected to a heat treatment to prepare a composition, followed by adding to the composition, if any, the remaining part of Component (A), optionally subjecting the resultant admixture to a heat treatment, and adding thereto Component (C) and Component (B) with stirring.

The above-described organosilazane compound acts as an agent for surface treatment of silica.

As examples of such an organosilazane compound, mention may be made of organosilazane compounds having no carbon-functional groups (e.g., alkenyl groups), including hexaoranosilazanes and octaorganotrisilazanes having alkyl groups, aryl groups, substituted alkyl groups or the like, such as $(CH_3)_3SiNHSi(CH_3)_3$, $(CH_3)_3SiNHSi(CH_3)_2NHSi(CH_3)_3$ and $(CH_3)_2(CF_3CH_2CH_2)SiNHSi(CF_3CH_2CH_2)(CH_3)_2$; and organosilazane compounds having alkenyl groups (e.g., vinyl groups), such as $(CHR_3)_2(CH_2=CH)SiNHSi(CH_3)_2NHSi(CH=CH_2)(CH_3)_2$, $(CH3)3SiNHSi(CH3)(CH2=CH)[Osi(CH3)2]nNHSi(CH3)2$ (n=1~10) and $CH_2=CHSi[NHSi(CH_3)_3]_3$. In particular, the latter organosilazane compounds, or those containing alkenyl groups, are preferred over the others from the standpoint of improving the tearing strength of the cured matter.

From the standpoint of effecting the silylation treatment of finely powdered silica surface, the amount of an organosilazane compound added is within the range of 1 to 100 parts by weight, preferably 5 to 50 parts by weight, per 100 parts by weight of Component (D). When the amount added is less than 1 part by weight, the silylation treatment shows no effect; while, when it is increased beyond 100 parts by weight, the cured matter obtained deteriorates in physical properties.

The heat treatment in the present invention is preferably carried out in the following manner: Firstly, the mixture prepared above (namely, the composition constituted of all or a part (for example, at least 50 weight %, preferably 60–100 weight %) of Component (A), Component (D), an organosilazane compound and optionally added water) is heated preferably at 10–100° C. for 0.1–5 hours. During the first heating step, care should be taken not to raise the temperature of the mixture beyond 100° C. since the evolution of heat occurs upon mixing. If the temperature is higher than 100° C., water and the silazane compound would vaporize to fail in effective silylation. Secondly, the resultant mixture is heated with, if any, the remaining Component (A) at a temperature ranging preferably from 100 to 250° C. for 0.5–5 hours. When the heating temperature during this step is lower than 100° C., satisfactory treatment could not be achieved. On the other hand, the heating at a temperature higher than 250° C. is undesirable because it is accompanied with much danger of explosion. Thus, it is more preferable for the second heating step to be carried out at a temperature of 120–180° C.

In the second heating step, the silazane compound decomposes to evolve a large quantity of ammonia gas. In order to prevent the ammonia gas explosion from occurring, it is therefore desirable to remove the ammonia gas by admitting an inert gas, such as nitrogen gas, into the reaction system or reducing the pressure of the reaction system.

In starting on the second heating step, it is also 5 desirable to admix, if any, the remaining portion of the organopolysiloxanes as Component (A) or an organosilicone resin having triorganosiloxy units and $SiO_2$ units as essential constitutional units with the aforementioned mixture.

As examples of an organosilicone resin which can be preferably used above, mention may be made of organosilicone resins constituted basically of $R_3SiO_{1/2}$ units (wherein R has the same meaning as described hereinbefore) and $SiO_2$ units, such as toluene-soluble vinyl group-containing silicone resins wherein $(CH_3)_3SiO_{1/2}$ units, $(CH_2=CH)(CH_3)_2SiO_{1/2}$ units and $SiO_2$ units are contained as their constitutional units, the equivalent of vinyl group is from 0.02 to 0.20 mole/100 g and the ratio of the sum of $(CH_3)_3SiO_{1/2}$ units and $(CH_2=CH)(CH_3)_2SiO_{1/2}$ units to $SiO_2$ units is from 0.6 to 1.0 by mole.

Such organosilicone resins as described above can lower the viscosity of the composition since they have silanol groups (SiOH) intrinsically, and impart physical strength to the cured matter.

In a preferred embodiment of the present invention, two packages are prepared in advance, one package containing a mixture of Components (A), (C) and (D), with the mixture being prepared by adding Component (D) to Component (A), subjecting them to a heat treatment and then admixing with a catalyst as Component (C), and the other package containing Component (B), and the present composition is prepared by mixing the contents of those two packages when the use thereof is required.

The present composition may be admixed with a control agent for adjusting a curing time, if desired. Specific examples of such a control agent include vinyl group-containing siloxane, such as vinylcyclotetrasiloxane; triallylisocyanurate, alkynyl maleates, acetylene alcohols, and the products obtained by modifying those compounds with silane or siloxane; hydroperoxide; tetramethylethylenediamine; bezotriazoles; and a mixture of two or more thereof.

In addition, as far as the present objects are not damaged, a diluent for the control of viscosity and hardness, such as a non-reactive organopolysiloxane and an organopolysiloxane whose ends are blocked with hydroxysilyldimethyl groups, a coloring agent, such as inorganic pigments (e.g., cobalt blue) and organic dyes, and an agent for improving heat-resisting and flame-retarding properties, such as cerium oxide, zinc carbonate, manganese carbonate, iron oxide red, titanium oxide and carbon black, can be added to the present composition.

The present composition thus prepared can have low viscosity of below 1,000 poise, generally from 100 to 800 poise, especially from 150 to 500 poise, at 25° C. Even after long-range storage, the present composition can retain the aforesaid low viscosity.

The present invention will now be illustrated below in more detail by reference to the following examples. However, the invention should not be construed as being limited to these examples.

Synthesis Example 1

Synthesis of Component (A):

In a 3-liter flask were placed 1628 g of octamethylcyclotetrasiloxane, 9.3 g of 1,3-divinyl-1,1,3,3- tetramethyldisiloxane, 20 g of distilled water and 0.001 g of potassium hydroxide. The flask was kept at 120° C. for 1 hour, and then at 150° C. for 4 hours, thereby completing the reaction. Thereafter, 0.1 g of ethylenechlorohydrin was added to neutralize the reaction mixture.

Next, the stripping operation under the condition of 150° C.—50 mm Hg was carried out for 2 hours to remove low boiling matters. The reaction product thus obtained was passed through a filter, and examined for viscosity; as a result, the kinematic viscosity thereof was found to be 980 at 25° C. Further, the vinyl group content in the reaction product obtained was determined by iodide method, and thereby it was found to be 0.0063 mole/100 g.

From the amounts of starting materials used and the vinyl value determined above, the reaction product obtained was found to be the mixture of a dimethylpolysiloxane blocked with dimethylvinylsiloxy groups at both ends, a dimethylpolysiloxane blocked with a dimethylvinylsiloxy group at one end and with a dimethylhydroxysilyl group at the other end and a dimethylpolysiloxane blocked with dimethylhydroxysilyl groups at both ends in the ratio of about 1:2:1 (by weight).

Synthesis Example 2
Synthesis of Constituent (ii) of Component (A):

In a 3-liter flask were placed 1628 g of octamethyltetracyclosiloxane, 8.6 g of 1,3,5,7-tetravinyl-1, 3,5,7tetramethylcyclotetrasiloxane, 10 g of distilled water and 0.001 g of potassium hydroxide. The flask was kept at 120° C. for 1 hour, and then at 150° C. for 4 hours, thereby completing the reaction. Thereafter, 0.1 g of ethylenechlorohydrin was added to neutralize the reaction mixture.

Next, the stripping operation under the condition of 150° C.—50 mm Hg was carried out for 2 hours to remove low boiling matters. The reaction product thus obtained was passed through a filter, and the filtrate was examined for viscosity; as a result, the kinematic viscosity thereof was found to be 1,060 cSt at 25° C. Further, the vinyl group content in the reaction product obtained was determined by iodide method, and thereby it was found to be 0.0059 mole/100 g.

From the amounts of starting materials used and the vinyl value determined above, the reaction product obtained was confirmed to be the dimethylpolysiloxane blocked with dimethylhydroxysilyl groups at both ends and having one vinyl group per molecule in a side chain thereof.

PREPARATION OF COMPONENT (A)-COMPONENT (D) MIXTURE

Preparation Example 1

The dimethylpolysiloxane mixture obtained in Synthesis Example 1 in an amount of 600 g (Part ①), 400 g of hydrophobic silica, Aerosil R-812 (trade name, a product of Degussa Co.), 20 g of hexamethyldisilazane and 10 g of water were placed in a kneader, homogeneously mixed for one hour at a temperature ranging between room temperature and 100° C., and then kept at 150° C. for 2 hours. Further thereto, 400 g of the foregoing dimethylpolysiloxane mixture obtained in Synthesis Example 1 (Part ②) was added, followed by mixing them homogeneously at 150° C. The resultant mixture was cooled to 25° C., and examined for viscosity by means of a rotational viscometer (made by Tokyo Keiki K. K.); as a result, the mixture was found to have the viscosity of 340 poise at 25° C.

Preparation Example 2

A mixture was prepared in the same manner as in Preparation Example 1, except that a 600 g portion of the dimethylpolysiloxane obtained in Synthesis Example 2 [Constituent (ii)] was used in place of Part ① and 400 g of the dimethylpolysiloxane blocked by dimethylvinylsilyl groups at both ends and having a kinematic viscosity of 100 cSt at 25° C. [Constituent (i)] was used in place of Part ②, and examined for viscosity by means of the same viscometer as used in Preparation Example 1; as a result, the mixture was found to have the viscosity of 310 poise at 25° C.

Preparation Example 3

A mixture was prepared in the same manner as in Preparation Example 1, except that 400 g of hydrophilic silica, Aerosil 200 (trade mane, a product of Nippon Aerosil Co.), was used in place of the hydrophobic silica, Aerosil R-812, and the viscosity thereof was measured with the same viscometer as in Preparation Example 1. As a result, the mixture was found to have the viscosity of 280 poise at 25° C.

Comparative Preparation Example 1

A mixture was prepared in the same manner as in Preparation Example 2, except that 600 g of the dimethylpolysiloxane blocked by dimethylvinylsilyl groups at both ends and having a kinematic viscosity of 100 cSt at 25° C. [(Constituent (i)] was used in place of the dimethylpolysiloxane obtained in Synthesis Example 2 [Constituent (ii)], and the viscosity thereof was measured with the same viscometer as in Preparation Example 2. As a result, the mixture was found to have the viscosity of 1,050 poise at 25° C.

Comparative Preparation Example 2

In a kneader, 1,300 g of the dimethylpolysiloxane blocked by dimethylvinylsilyl groups at both ends and having a kinematic viscosity of 100 cSt at 25° C., 300 g of the dimethylpolysiloxane blocked by dimethylhydroxysilyl groups at both ends and having a kinematic viscosity of 100 cSt at 25° C., 400 g of hydrophobic silica, Aerosil R-812 (trade name, a product of Degussa Co.), 20 g of hexamethyldisilazane and 10 g of water were placed, homogeneously mixed for one hour at a temperature ranging between room temperature and 100° C., and then kept at 150° C. for 2 hours.

Further thereto, 200 g of the dimethylpolysiloxane blocked by dimethylvinylsilyl groups at both ends and having a kinematic viscosity of 100 cSt at 25° C. and 200 g of the dimethylpolysiloxane blocked by dimethylhydroxysilyl groups at both ends and having a kinematic viscosity of 100 cSt at 25° C. were added, followed by mixing them homogeneously at 150° C. The resultant mixture was cooled, and examined for viscosity by means of a rotational viscometer (made by Tokyo Keiki K. K.); as a result, the mixture was found to have the viscosity of 310 poise at 25° C.

EXAMPLES 1–3 AND COMPARATIVE EXAMPLES 1–2

Each of the five kinds of mixtures (obtained in Preparation Examples 1–3 and Comparative Preparation Examples 1–2) in a 100 g portion was admixed with a platinum-vinylsiloxane complex in a proportion of 20 ppm, based on platinum, to the organopolysiloxanes in each mixture, and 0.01 g of ethinylcyclohexanol. Then, the resultant mixtures each were further admixed with the hydrogenpolysiloxane represented by the following structural formula;

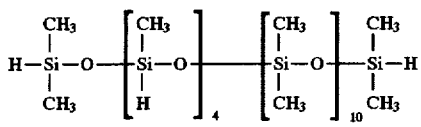

in amounts set forth in Table 1, respectively, to prepare homogeneous compositions. Each of the compositions thus prepared was poured into a molding box and cured for 2 hours at 60° C. to make a 2 mm-thick sheet. Each of these sheets was punched in the form of Dumbbell No. 2 and examined for hardness, elongation percentage, tensile strength and tearing strength according to JIS K 6301. The measured results of those physical properties are shown in Table 1.

Separately, each of the compositions prepared above was subjected to an accelerating test in order to evaluate a viscosity increase on standing. In the test, each composition was heated for 6 hours at 100° C., and then the viscosity thereof was measured at 25° C. with the same rotational viscometer as used above. The measured values of such accelerated viscosity are also shown in Table 1.

TABLE 1

|  | Example 1 | Example 2 | Example 3 | Comparative Example 1 | Comparative Example 2 |
|---|---|---|---|---|---|
| Amount of Hydrogenpolysiloxanes added (g) | 1.3 | 1.95 | 1.3 | 2.6 | 1.3 |
| Hardness (JISA) | 21 | 28 | 23 | 48 | 5 |
| Elongation (%) | 650 | 420 | 510 | 310 | 120 |
| Tensile Strength (kgf/cm$^2$) | 85 | 74 | 87 | 54 | 15 |
| Tearing Strength (kgf/cm$^2$) | 35 | 28 | 37 | 5 | 3 |
| Initial Viscosity (poise) | 340 | 310 | 280 | 1050 | 310 |
| Accelerated Viscosity (poise) | 450 | 480 | 720 | 1560 | 420 |

As can be seen from Table 1, the compositions according to the present invention had low viscosity not only in an initial stage but also in an accelerated condition by heating, and the cured matters obtained therefrom were silicone elastomers having sufficiently high physical strength.

On the other hand, the composition of Comparative Example 1, which was free from Constituent (ii) of Component (A), was too high in viscosity and provided a cured matter which was decidedly inferior in physical properties to those obtained from the present compositions; and the composition of Comparative Example 2, wherein the organopolysiloxane which was end-blocked by hydroxysilyl groups but had no alkenyl group was used instead of Constituent (ii) of the present invention, provided a cured matter considerably inferior in physical properties although it had low viscosity.

What is claimed is:

1. A non-foaming curable silicone elastomer composition comprising:

(A) 100 parts by weight of organopolysiloxanes having an average compositional formula, $R_aSiO_{(4-a)/2}$, wherein R represents a hydroxyl group or a substituted or unsubstituted monovalent hydrocarbon group and a is a figure of from 1.85 to 2.4; said organopolysiloxanes being constituted at least of 90–10 parts by weight of organopolysiloxanes (i) containing, in a molecule, at least two alkenyl groups and substantially no silicon-attached hydroxyl group and having their kinematic viscosity in the range of 100 to 100,000 centistokes (cSt) at 250° C. and 10–90 parts by weight of organopolysiloxanes (ii) containing, in a molecule, at least one hydroxyl group attached directly to a silicon atom and at least one alkenyl group attached directly to a silicon atom and having their kinematic viscosity in the range of 100 to 100,000 cSt at 25° C.;

(B) organohydrogenpolysiloxanes which are represented by an average compositional formula, $R_bH_cSiO_{(4-b-c)/2}$, wherein $R^1$ is a substituted or unsubstituted monovalent hydrocarbon group which contains no aliphatic unsaturated bond, b is a figure of from 0.7 to 2.2 and c is a figure of from 0.01 to 1.2, provided that the sum b+c is from 1 to 2.5, and have in each molecule at least 3 hydrogen atoms attached directly to silicon atoms, in an amount that the organohydrogen-polysiloxanes afford 0.4–10.0 moles of silicon-attached hydrogen atoms to 1 mole of alkenyl groups supplied from Component (A);

(C) a platinum group metal catalyst; and (D) 10–60 parts by weight of finely powdered silica having a specific surface area of at least 50 m$^2$/g, measured by BET method.

2. A curable silicone elastomer composition according to claim 1, said composition having viscosity of no higher than 1,000 poise.

3. A curable silicone elastomer composition according to claim 1, wherein the organopolysiloxanes (i) are straight-chain diorganopolysiloxanes represented by the following formula (1), (2), (3) or (4):

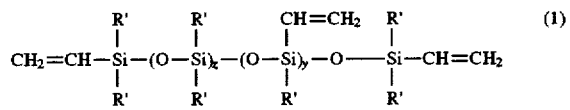

(1)

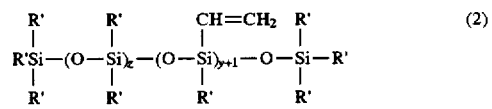

(2)

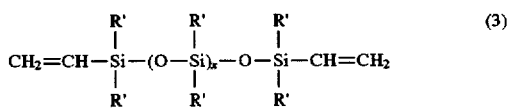

(3)

-continued

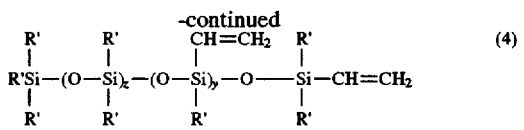

wherein R' is a substituted or unsubstituted monovalent hydrocarbon group other than an alkenyl group; and x, y and z are each a positive integer satisfying the following relations: $50 \leq x \leq 1500$, $1 \leq y \leq 50$ and $50 \leq z+y \leq 1500$.

4. A curable silicone elastomer composition according to claim 3, wherein the R' groups are methyl groups, trifluoropropyl groups or a mixture thereof.

5. A curable silicone elastomer composition according to claim 1, wherein the organopolysiloxanes (ii) are straight-chain diorganopolysiloxanes represented by the following formula (5), (6) or (7):

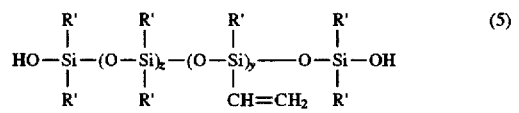

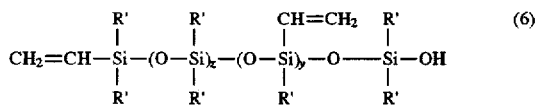

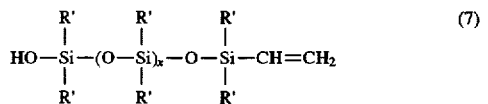

wherein R' is a substituted ot unsubstituted monovalent hydrocarbon group other than an alkenyl group; and x, y and z are each a positive integer satisfying the following relations: $50 \leq x \leq 1500$, $1 \leq y \leq 50$ and $50 \leq z+y \leq 1500$.

6. A curable silicone elastomer composition according to claim 1, wherein the specific surface area of the finely powdered silica is from 100 to 500 m²/g, measured by BET method.

7. A curable silicone elastomer composition according to claim 6, wherein the silica is a hydrophobic silica.

8. A method of preparing a non-foaming curable silicone elastomer composition, comprising the steps of:

(1) adding 10–60 parts by weight of finely powdered silica as Component (D) having a specific surface area of at least 50 m²/g, measured by BET method, to 100 parts by weight of organopolysiloxanes as Component (A) having an average compositional formula, $R_aSiO_{(4-a)/2}$, wherein R represents a hydroxyl group or a substituted or unsubstituted monovalent hydrocarbon group and a is a figure of from 1.85 to 2.4, said organopolysiloxanes being constituted at least of 90–10 parts by weight of organopolysiloxanes (i) containing, in a molecule, at least two alkenyl groups and substantially no silicon-attached hydroxyl group and having their kinematic viscosity in the range of 100 to 100,000 centistokes (cSt) at 25° C. and 10–90 parts by weight of organopolysiloxanes (ii) containing, in a molecule, at least one hydroxyl group attached directly to a silicon atom and at least one alkenyl group attached directly to a silicon atom and having their kinematic viscosity in the range of 100 to 100,000 cSt at 25° C.;

(2) adding thereto a silazane compound and water in proportions of 1–100 weight % and 0–100 weight %, respectively, to the finely powdered silica added above, followed by mixing them;

(3) subjecting the resultant mixture to a heat treatment; and then (4) admixing the heat-treated mixture with a platinum group metal catalyst as Component (C), and organohydrogen-polysiloxanes as Component (B) represented by an average compositional formula, $R^1_bH_cSiO_{(4-b-c)/2}$, wherein $R^1$ is a substituted or unsubstituted monovalent hydrocarbon group which contains no aliphatic unsaturated bond, b is a figure of from 0.7 to 2.2 and c is a figure of from 0.01 to 1.2, provided that the sum b+c is from 1 to 2.5, and having in each molecule at least 3 hydrogen atoms attached directly to silicon atoms in an amount that the organohydrogen-polysiloxanes afford 0.4–10.0 moles of silicon-attached hydrogen atoms to 1 mole of alkenyl groups supplied from Component (A).

9. A method of preparing a non-foaming curable silicone elastomer composition according to claim 8, wherein at least 50 weight % portion of the organopolysiloxanes as Component (A) is admixed with the finely powdered silica as Component (D) and the remaining portion of Component (A) is added to the resultant admixture during the heat treatment.

10. A method of preparing a non-foaming curable silicone elastomer composition according to claim 8, wherein an organosilicone resin comprising triorganosiloxy units and $SiO_2$ units is further added during the heat treatment.

11. A curable silicone elastomer composition according to claim 1, wherein the organohydrogenpolysiloxanes as Component (B) have from 3 to 200 silicon atoms per molecule.

* * * * *